UNITED STATES PATENT OFFICE.

JOHN Y. SMITH, OF PITTSBURG, PENNSYLVANIA.

IMPROVEMENT IN LININGS FOR METALLURGIC FURNACES.

Specification forming part of Letters Patent No. 120,006, dated October 17, 1871.

*To all whom it may concern:*

Be it known that I, JOHN Y. SMITH, of Pittsburg, in the county of Allegheny and State of Pennsylvania, have invented a new and useful Improvement in Furnace-Linings; and I do hereby declare that the following is a full, clear, and exact description of the same.

This improvement relates to furnace-linings especially designed for lining reverberatory and other metallurgic furnaces, but also applicable to other furnaces where a refractory lining is necessary to protect the walls of the furnace against the action of heat or the materials contained in the furnace.

The following description will enable persons skilled in the art to prepare and apply the same.

To form a continuous solid lining, such as is required for lining revolving puddling-furnaces, I use, say four hundred and fifty pounds of finely-powdered quartz, and three hundred and fifty pounds of pure white sand, such as is used in making glass; and to these I add five pounds of salt and twenty-five pounds of lead, or more lead and less salt for the finest work—or for ordinary work the salt alone may be used—the object being to flux the silex so that, on being subjected to a very intense heat, it will form into a very solid mass of a highly-refractory power.

I have set forth in another application filed at the same time herewith, a mode of packing the pulverulent compound above named, moistened with a little water to give it adhesion, by means of staves arranged on the inside of a rotary puddling-furnace, between which and the shell of the furnace the silex could be packed and held until by the action of heat it was fluxed and formed into a compact mass.

In preparing a lining for the bottoms or boshes of other furnaces I pack the powdered silex carefully, and then sprinkle over it the above fluxes or soda, or pulverized clean ore, or pulverized clean mill-scale, or other fluxing material, and then subject it to a heat considerably higher than it is ever intended to be subjected to in the operation of the furnace. By this means a very hard refractory and enduring lining may be formed. Care should be taken, in carrying out this process, to use only enough of the fluxing materials to cause the pulverized quartz to melt sufficiently to form a solid lining. In ordinary furnace floors the pulverized quartz may be even used alone, as the ore and scale used and formed will cause it gradually to flux into a solid mass much more durable than any lining with which I have heretofore been acquainted.

I do not limit my claim to the use of any particular flux. I prefer the use of salt and lead; but others may be used, some, only, of which I have indicated.

What I claim as my invention, and desire to secure by Letters Patent, is—

1. A solid continuous furnace-lining of silex, substantially as set forth.

2. The process of forming a furnace-lining by fluxing pulverized quartz or silex, substantially as set forth.

In testimony whereof I have signed my name to this specification in the presence of two subscribing witnesses.

JOHN Y. SMITH.

Witnesses:
   B. EDW. J. EILS,
   A. RUPPERT.

(99)